United States Patent
Charpentier et al.

(10) Patent No.: US 6,360,096 B1
(45) Date of Patent: Mar. 19, 2002

(54) MOBILE TELEPHONY METHOD AND SYSTEM USING SIGNALING MESSAGES WITH PRIORITY LEVELS

(75) Inventors: Jean Charpentier, Viroflay; Edouard Issenmann, Le Chesnay; Roger Larousse, Perros Guirec; Patrick Lohat, Montesson, all of (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/417,629

(22) Filed: Oct. 14, 1999

(30) Foreign Application Priority Data

Oct. 15, 1998 (FR) .............................. 98 12930

(51) Int. Cl.$^7$ ................................. H04Q 7/20
(52) U.S. Cl. ...................... 455/433; 455/435
(58) Field of Search ................ 455/433, 432, 455/435, 445

(56) References Cited

U.S. PATENT DOCUMENTS

| | | |
|---|---|---|
| 5,548,533 A | 8/1996 | Gao et al. |
| 5,579,375 A | * 11/1996 | Ginter ........................ 455/433 |
| 5,761,500 A | 6/1998 | Gallant et al. |

FOREIGN PATENT DOCUMENTS

| | | |
|---|---|---|
| WO | WO 98/15133 | 4/1998 |

OTHER PUBLICATIONS

Platt, A. et al.: "Distributed Management of Mobility for Mobile Cellular Networks" ICCC '97 13$^{th}$ International Conference on Computer Communication Keys to a Mature Information Society, CANNES Nov. 18–21, 1997 No. CONF. 13, Nov. 18, 1997, pp. 351–357, XP000753912, International Council for Computer Communication (ICCC).

* cited by examiner

*Primary Examiner*—Lee Nguyen
(74) *Attorney, Agent, or Firm*—Sughrue Mion, PLLC

(57) ABSTRACT

In a GSM type system, home location register resets after some incidents are programmed from a back-up register. The invention proposes that mobile service switching centers create a difference between two classes of update requests which they send to the home location register in two different situations. In the first class a message following a change of area by a mobile station takes priority. In the second class a message follows a home location register reset and tends to (frequently unnecessarily) re-establish the conformity of the data in the home location register and in the visitor location registers of the centers. The second class is assigned a low priority level which prevents problems with the availability of the home location register. Application to telephony.

8 Claims, 1 Drawing Sheet

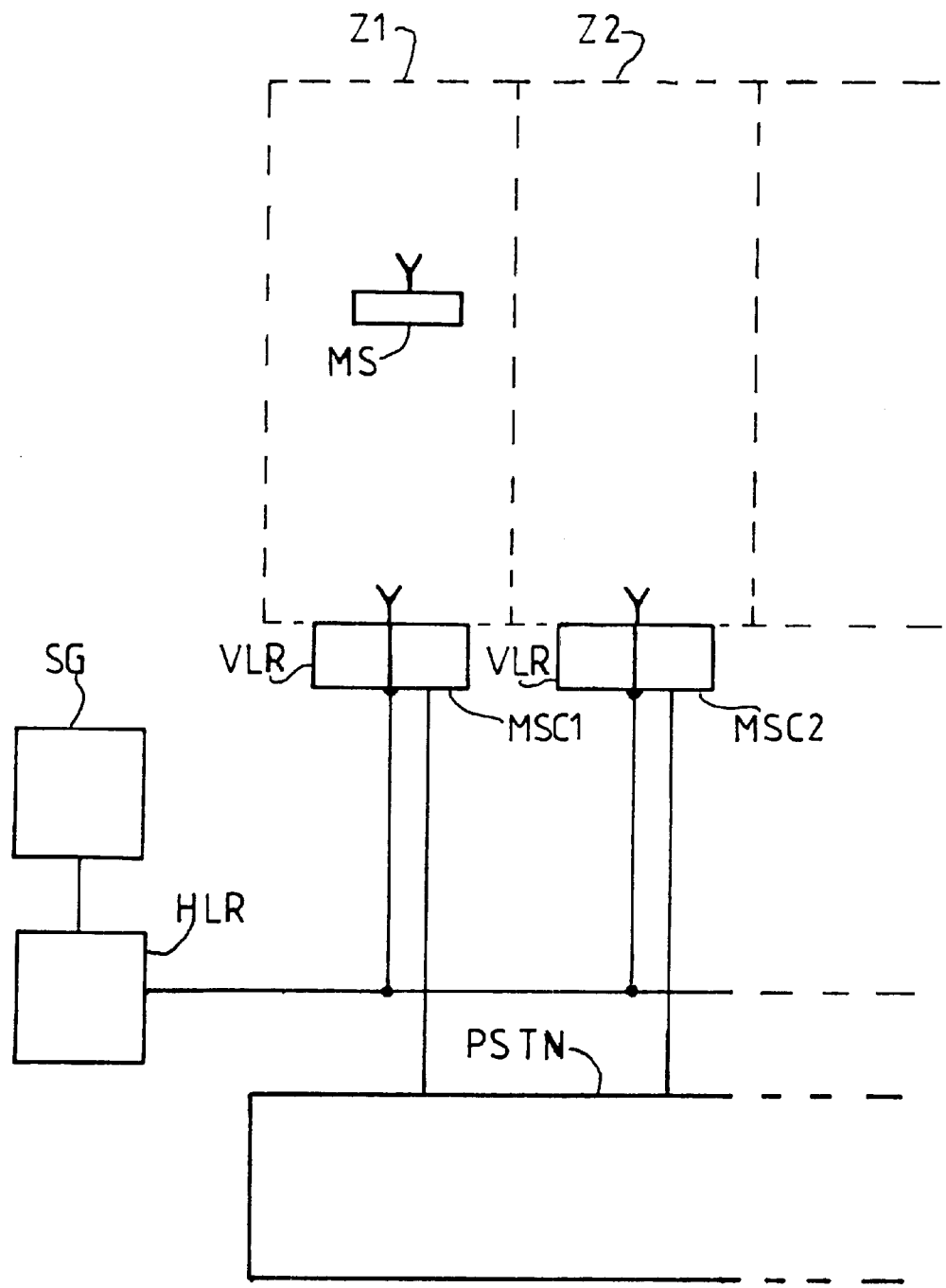

MOBILE TELEPHONY METHOD AND SYSTEM USING SIGNALING MESSAGES WITH PRIORITY LEVELS

The present invention concerns a mobile telephony method and system. A system of the kind concerned is referred to as a "Global System for Mobile communications" (GSM). To describe it in a somewhat simplified manner, it includes mobile stations carried by respective users of the mobile stations, who are subscribers of the system. The mobile stations provide radio links with Mobile service Switching Centers (MSC). The MSCs have respective coverage areas. Each mobile station enables its user to be one party to a call linking it to at least one other party via a center visited by the mobile station. The center is the MSC in whose coverage area the mobile station is temporarily located. Beyond the center, the call in question travels through the remainder of the system and possibly, if the other party is not a subscriber of the system, via the Public Switched Telephone Network (PSTN).

BACKGROUND OF THE INVENTION

To enable call set-up and billing, each MSC stores the identity of each mobile station visiting the center and a Home Location Register (HLR) stores data concerning all the mobile stations of the system. The data in the HLR include the locations of the mobile stations, i.e. the identities of the MSC visited by the mobile stations.

Many messages are sent to the HLR to ask it for information needed to set up calls passing through the system because at least one of the parties to be linked by such calls is a subscriber of the system. This is why the data in the HLR is individually updated each time a mobile station moves from one area to another and after each change of status of a user. The user's status defines conditions under which the user has access to the system and is billed. It is part of the data concerning the user's mobile station. The data is collectively backed up in another register. These operations are carried out periodically so that the back-up register does not contain locations of mobile stations which have moved since the last such operation. Some modifications, such as those concerning the status of some categories of users, are done in the back-up register first.

Following any such modification in the back-up register, or following other incidents that can affect the validity of the data in the HLR, the data is collectively updated in an operation which is referred to as a "reset," that is based on data from the back-up register. The reset is reported to the MSC. On the first contact of a mobile station with the MSC it is visiting after a reset, the center sends the HLR a message to harmonize the data concerning the mobile station in the MSC and in the HLR. The location of the mobile station is updated in the HLR on the basis of the identity of the center sending the message and the data defining the status of the user of the mobile station is updated in the center from data contained in the HLR.

Prior art systems of the above kind have the disadvantage that, when a system of this kind is requested to set up a call, call set-up is sometimes impeded by unavailability of the system, in other words the call request that requests call set-up is not completed even though the called party is available.

OBJECTS AND SUMMARY OF THE INVENTION

An aim of the present invention is to provide a simple and low-cost way to limit such unavailability of the system. With this aim in view, the invention consists in a method which conventionally includes operations performed by a HLR containing respective data on a plurality of mobile stations. Each such operation consists in exploiting a message triggering the operation. To be able to select some of the messages in order to be able to exploit them in an overload situation, the HLR assigns each message a priority level chosen from a scale of such levels.

Some of the operations effected by the HLR are collective updates of mobile station data. Each such update constitutes a reset and is reported to a plurality of MSCs each containing the data of the mobile stations located in the area of the center.

Other operations are individual updates. Each such update consists in exploiting a message transmitted by a MSC and updates in the HLR the data of a mobile station constituting a station to which the message relates.

Some of the individual updates are visit updates. A message requesting a visit update is transmitted by a MSC to exploit a visit notification reporting the arrival of the mobile station to which the message relates in the area of the center, the message constituting a visit request.

Other individual updates are referred to as updates after a reset. A message requesting an update after a reset is transmitted by a MSC to exploit a contact between the center and the mobile station to which the message relates. It constitutes a request after a reset. It is transmitted when three conditions are combined:

the mobile station is in the area of the center, the contact is after a preceding message transmitted by the center relating to the mobile station and requesting a visit update, and the contact is a first contact between the mobile station and the center since a reset was reported to the center.

In the method of the invention the MSCs introduce a difference between visit update requests and update after a reset requests detectable by the HLR and by means of which the HLR assigns update after a reset requests a lower priority level than visit update requests.

In the context of the present invention, it has been found that many instances of unavailability in prior art systems were related to the bit rate of messages sent to the HLR by the MSCs, the bit rate sometimes exceeding the HLR's capacity to exploit such messages. It has been realized that abstaining from or delaying the exploitation of such messages would lead directly to only a few instances of unavailability of the system if such abstention were in practice limited to messages received by the HLR after a reset and at the same time as other messages needed to set up a call currently requested or requested afterwards. More particularly, it has been realized that there are then many fewer instances of unavailability than occur on abstaining from responding to the other messages in prior art systems. The present invention therefore avoids the additional cost that would be generated by increasing the HLR's capacity for exploiting the messages it receives, at least when the increase in capacity would be sufficient to eliminate instances of unavailability linked to messages sent after a reset.

BRIEF DESCRIPTION OF THE DRAWING

The single FIGURE of the accompanying drawing shows, by way of example, a mobile telephone system implementing the present invention.

MORE DETAILED DESCRIPTION

The system covers a territory which is divided into a plurality of areas Z1, Z2, etc. defined by the system. It has subscribers who move between the two areas. It includes interconnected units with respective software. The software defines messages, classes of messages and operations. The operations include forming, transmitting and/or exploiting some of the messages, each operation being effected by a unit to exploit a message received by the unit and associated with the operation. The messages and the operations are such that the system can set up calls via some of the units, each call transmitting data between two parties to the call. One of the two parties is a subscriber of the system and the other party can also be either a subscriber of the system or connected to the system via the Public Switched Telephone Network (PSTN). One of the two parties originated the setting up of the call and constitutes a calling party of the call and the other party constitutes a called party of the call.

The units for setting up calls include: Mobile stations (MS). Each such mobile station has an identifier. The mobile station belongs to a user who is a subscriber of the system and constitutes an intermediary between the user and the system. The mobile station has parameters which define the status of its user relative to the system, for example. The mobile station can be moved by its user within and between the areas of the system. Its intermediary function is rendered compatible with its mobility by virtue of the fact that it sends and receives data messages by radio. It is typically in the form of a mobile telephone carried by its user or in the user's vehicle. Its identifier is typically defined by a SIM card inserted into a standard device.

A plurality of mobile service switching centers MSC1, MSC2, etc. The MSCs have respective identifiers and the areas Z1, Z2, etc. respectively belong to them. Each such area is typically divided into a plurality of cells each covered by an antenna of the MSC to which the area belongs. Although some problems are related to the fact that a mobile station can pass from one cell to another cell within the same area, the invention does not address these problems. Due to the antennas, each MSC is able to exchange data and messages by radio with each mobile station when the mobile station is in the area of the center. The mobile station and the center then respectively constitute a mobile station visiting the center and a center visited by the mobile station. The combination of the respective identifiers of the visitor mobile station and the visited MSC then constitutes the location of the visitor mobile station, the location and said parameters of the mobile station constituting mobile station data. Each such center includes a visitor location register (VLR) constituting a memory of the center. The VLR is updated by messages and stores the data of all the visitor mobile stations of the center. The VLR is also able to write into memory and to read out of memory signals after a reset which are associated with respective visitor mobile stations and whose function is indicated below.

A Home Location Register (HLR) for storing the data of all the mobile stations of the system. To allow for modifications that are made frequently to some of the data, the HLR is automatically updated by a first group of messages. Also, the HLR has a predetermined capacity for exploiting the messages that it receives and sometimes said capacity is exceeded by the throughput of such messages. In these instances, simultaneous exploitation of all such messages is then impossible. The HLR's software therefore includes a priority rule defining a scale of priority levels and assigning each message received a priority level according to the class of the message. The rule assigns to each message received by the HLR a probability of being exploited without delay that decreases as the priority level of the message decreases and as the throughput of messages received by the HLR approaches the exploitation capacity of the HLR. The rule tends to assure exploitation of messages having the highest priority levels. To this end, it rejects some of the messages that have the lowest priority levels. It could merely delay exploitation of the rejected messages, however, for reasons of simplicity, it typically prevents them totally. The rule could more particularly define for each priority level a percentage not greater than 100% that constitutes a load threshold associated with the level. For example, the load threshold increases as the level increases. The rule would then oppose exploitation by the HLR of a message received by the HLR if the load on the register exceeds the load threshold associated with the priority level of the message. Appropriate priority rules are well-known to the skilled person and are used in GSM type systems.

A location back-up register (SG) that can be updated by a second group of messages to store the data of all the mobile stations. The locations and parameters then constitute backed up data. The second group of messages are different from the first group of messages.

Some classes of messages and associated operations will now be described: One class of messages will be referred to hereinafter as visit notifications. Each mobile station forms and transmits a visit notification each time it leaves one area and enters another area, the other area constituting a new visited mobile station. The visit notification indicates at least the identifier of the mobile station. It is received by the MSC for the new visited area. The visited MSC exploits the visit notification by storing the new location of the mobile station in its VLR.

One class of messages belongs both to the first group of messages previously mentioned and to a group of "LOCATION UPDATE" requests (to use the terminology of the GSM). In particular, request of this class are respectively associated with the visit notifications and are referred to hereinafter as "visit update requests." Each MSC further exploits each visit notification by forming a request of the above kind associated with the notification. The request includes the new location of the mobile station that transmitted the visit notification. The MSC transmits the request to the HLR that exploits the request by taking the new location into memory if the priority rule does not prohibit such exploitation.

Some of the messages including the visit notifications constitute presence indications, each of which is formed by a mobile station and received by the MSC visited by the mobile station. It is therefore representative of the presence of the mobile station in the area of the center.

One class of messages consists of terminal call requests. Each such call request is associated with a call to be set up for when the called party is a subscriber of the system. The call request originates with the calling party and includes the identifier of the mobile station of the called party, which constitutes the called station. It is received and exploited by the MSC, which constitutes an access point to the system for the call request.

One class of messages is made up of "SEND ROUTING INFORMATION" requests (to use the terminology of the GSM again). These requests have a lower priority level than visit update requests. The system access point exploits each terminal call request by forming a routing information request containing the identifiers of the access point and the called mobile station and then transmitting it to the HLR.

One class of messages will be referred to hereinafter as consisting of routing information blocks. If the priority rule does not prohibit it, the HLR exploits each routing information request by forming a routing block, allowing for the identity of the system access point and the identity of each MSC shown in the HLR as visited by the called mobile station. The HLR transmits the block to the access point and the access point exploits the block by completing the setting up of the call.

One class of messages belongs to the second group of messages previously mentioned. It consists of back-up messages formed at successive times by the HLR. Each such message contains the data of the mobile stations stored in the HLR. The back-up register exploits the message by taking the data into memory for updating.

One class of messages belonging to the first group of messages consists of reset blocks. Each reset block is formed by the back-up register in response to an incident from a class of incidents stored in the software of the system. The block contains the backed up data and is transmitted to the HLR. The HLR carries out a first exploitation of the block by taking the data into memory. The data then constitutes reset data and the first exploitation constitutes a reset.

One class of messages can be designated as consisting of reset notifications (to use the terminology of the GSM again). The HLR performs a second exploitation of each reset block by forming a reset notification and transmitting it to each MSC as representative of the reset that is being done or has just been done. The center exploits the notification by storing in memory respective signals after a reset associated with all present and future visitor mobile stations of the center.

Finally, one class of messages belonging to the first group of messages consists of other location update requests referred to hereinafter as update after a reset requests. Each MSC exploits each presence indication transmitted to it by a mobile station by forming an update after a reset request if the MSC has in its memory a signal after a reset associated with the mobile station. The request includes the location of the mobile station and is transmitted to the HLR. The HLR exploits the request by taking the location into memory if this is not prohibited by the priority rule. The MSC further exploits the presence indication by extracting the signal after a reset from memory.

Like the GSM (prior art), the system of the invention uses with advantage not only the above units, messages and operations but also other units, messages and operations, in particular to set up calls where only the calling party is a subscriber of the system and to assure call security by means of encryption.

Compared to prior art systems of the above kind, in the system of the invention the software of the MSCs creates a difference between visit update requests and update after a reset requests which the HLR can detect and by means of which (and with the aid of the software of the HLR) the priority level of visit update requests is made higher than the priority level of update after a reset requests.

In accordance with the invention, the difference between visit update and update after a reset requests consists in an indication of non-priority present only in update after a reset requests. The manner of creating an exploitable difference between the two classes of update requests has an effect in terms of the modification required to the software of existing systems to implement the invention. It achieves the modification in a simple manner and at low cost, update after a reset requests being the only signalling message that is modified, the modification of the HLR software being limited and easy to implement.

What is claimed is:

1. A mobile telephony method using signaling messages with priority levels, the method including operations effected by a home location register for exploiting messages received by the home location register, the home location register assigning each message a priority level chosen from a scale of such levels and such that the probability of exploitation of the message decreases as the priority level decreases, the home location register containing respective data of a plurality of mobile stations, some of said operations being updates including:

collective updates to said data of mobile stations, each update constituting a reset and being reported to a plurality of switching centers each containing said data of mobile stations within an area of a center, and individual updates each effected to exploit one of said messages sent by one of said switching centers, the updates updating in said home location register the data of one of said mobile stations constituting a mobile station to which the message relates, a set of individual updates including:

visit updates, each visit update request message being transmitted by one of said switching centers for exploitation of a visit notification reporting arrival of the mobile station to which the message relates in said area of the center, and updates after a reset, each update after a reset request message triggering one of said updates after a reset being transmitted by one of said switching centers to exploit a contact between the center and one of said mobile stations which is in said area of the center and to which the message relates, the contact occurring after a preceding one of said visit update request messages transmitted by the center, the mobile station being one to which the preceding message relates, the contact being a first contact between the mobile station and the center after a reset, wherein said switching centers introduce a difference which can be detected by said home location register between said visit update requests and said update after a reset requests, the home location register assigning update after a reset requests a lower priority level than visit update requests.

2. A mobile telephony system using signaling messages with priority levels, the system defining areas, having subscribers and including interconnected units with respective software defining messages, classes of messages and operations, the operations including forming, transmitting and/or exploiting some of said messages, each of said operations being effected by one of said units to exploit one of said messages received by the unit and associated with one of said operations, the messages and the operations being such that the system can set up calls via some of the units, each of said calls transmitting data between two parties of the call, at least one of the two parties being a subscriber of the system, one of the two parties originating the setting up of a call and constituting a calling party of the call, the other of the two parties constituting a called party of the call, said units including:

mobile stations having respective identifiers and parameters and belonging to respective users consisting of said subscribers, each of said mobile stations constituting an intermediary between its user and said system and being moved by the user within and between said areas, each of said mobile stations being adapted to transmit and to receive said data and said messages by radio, a plurality of switching centers having respective identifiers, said areas belonging to respective switching centers, each of said switching centers being adapted to exchange said data and said messages with each of said mobile stations only by radio and only when a mobile station is located in said area of a center, the mobile station and the center then respectively constituting a visitor mobile station of the center and a visited center of the mobile station, the combination of the respective two identifiers of the visitor mobile station and the visited center then constituting a location of the visitor mobile station, the location and said parameters of the visitor mobile station constituting data of the visitor mobile station, each of said switching centers including a visitor location register constituting a memory of the visited center and adapted to be updated by said messages so as to store said data of said visitor mobile station of the center and to take into memory and to remove from memory respective signaling messages after a reset associated with the visitor mobile station, a home location register adapted to be updated by a first group of said messages to store said data of all said mobile stations, the home location register having a capacity for exploitation of said messages it receives which can be exceeded by the throughput of the messages, the software of the home location register including a priority rule defining a scale of priority levels and assigning each of said messages that can be received by the home location register a priority level chosen from the scale according to the class of the message, the priority rule assigning each of said messages received by the home location register a probability of being exploited without delay that decreases as said priority level of the message decreases and said throughput of messages received by the home location register approaches said exploitation capacity of the home location register, and a location back-up register adapted to be updated by a second group of messages to store said data of all said mobile stations, said locations and parameters constituting backed up data, the second group of messages being different from said first group of messages, said classes of messages and associated operations including:

one of said classes of messages consisting of visit notifications, each of said mobile stations forming and transmitting one of said visit notifications each time the mobile station arrives in one of said areas constituting a new visited area so that one of said visit notifications is received by whichever of said switching centers that covers said new visited area, a visit notification indicating the identifier of a mobile station, one of said switching centers exploiting the visit notification by placing said new location of the mobile station in memory in its visitor location register, one of said classes of messages belonging to said first group of messages and consisting of respective update requests associated with said visit notifications, each of said switching centers performing another exploitation of each of said visit notifications by forming one of said visit update requests associated with the visit notification, a request including said new location of said mobile station which transmitted the visit notification, the switching center transmitted the request to said home location register, the home location register performing an exploitation of the request by taking the new location into memory if said priority rule does not prohibit said exploitation, some of said messages including said visit notifications constituting presence indications each formed by one of said mobile stations and received by said switching center visited by the mobile station so that the indication is representative of the presence of the mobile station in said area of the center, one of said classes of messages consisting of terminal call requests, each of said terminal call requests being associated with one of said calls, the call being a call to be set up and the called party of the call being one of said subscribers, a call request including the identifier of the mobile station of the called party and originating with said calling party of the call, the mobile station constituting a called station, the call request being received and exploited by one of said switching centers, the switching center constituting a point of access to said system for the call request, one of said classes of messages consisting of routing information blocks, said home location register performing one of said exploitations of a routing information request if said priority rule does not prohibit said exploitation, the home location register performing the exploitation by forming one of said routing information blocks allowing for the identity of said access point and the identity of the switching center that appears in the home location register as visited by the said called mobile station, the home location register transmitting the block to the access point, the access point exploiting the block by completing the setting up of said call to be set up, one of said classes of messages belonging to said second group of messages and consisting of back-up messages formed at successive times by said home location register, each of said back-up messages containing said data of the mobile stations stored in the home location register, said back-up register exploiting the back-up messages by taking data into memory for updating, one of said classes of messages belonging to said first group of messages and consisting of reset blocks, each of said reset blocks being formed by said back-up register in response to an incident belonging to a class of incidents inscribed in the software, a reset block containing said backed up data and being transmitted to said home location register, the home location register performing a first exploitation of the block by taking the data into memory so that the data then constitutes reset data, the first exploitation consisting in a reset, one of said classes of messages consisting of reset notifications, said home location register performing a second exploitation of each of said reset blocks by forming one of said reset notifications and transmitting it to each of said switching centers to represent said reset, the switching center exploiting the notification by placing said signaling messages in memory after a respective reset associated with all present and future visitor mobile stations of the center, and one of said classes of messages belonging to said first group of messages and consisting of update after a reset requests, each of said switching centers performing one of said exploitations of each of said presence indications transmitted to the center by one of said mobile stations and forming one of said updates after a reset requests if the switching center has in its memory one of said signaling messages after a reset associated with the mobile station, the update after a reset request including said location of the mobile station and being transmitted to said home location register, the home location register performing one of said exploitations of said update after a reset request by taking the location into memory if this is not prohibited by said priority rule, the switching center performing another exploitation of the presence indication by extracting a signal after a reset from memory, wherein said software of said switching centers creates a difference between visit update requests and update after a reset requests, said home location register being able to detect this difference, said priority level of visit update requests being higher than that of update after a reset requests.

3. A mobile telephony system according to claim 2, wherein said priority level of update after a reset requests is lower than that of said routing information requests.

4. A mobile telephony system according to claim 2, said difference between said visit update requests and said update after a reset requests comprising a non-priority indication present only in update after a reset requests.

5. A mobile telephony method using signaling messages with priority levels, the method comprising:

generating operations, for exploiting messages, effected by a home location register that received said messages;

assigning each of said messages a respective priority level, by the home location register, according to the class of said message; and storing in the home location register respective data of mobile stations; wherein:

some of said generated operations are updates of said data of mobile stations, including one or more of:
individual updates,
collective updates, and
updates after a reset; and a plurality of switching centers introduce a difference, detectable by said home location register, between an individual update request and an update after a reset request, the home location register assigning said respective priority level to each said request.

6. The mobile telephony method of claim 5, wherein:

each of said collective updates constitutes a reset reported to said switching centers, each containing said data of mobile stations within an area of a center, said individual updates of said messages, effected by one of said switching centers to exploit one of said messages, update in said home location register the data of one of said mobile stations constituting a mobile station to which the message relates, a set of said individual updates includes one or more of:
visit updates, each visit update request message transmitted by one of said switching centers for exploitation of a visit notification reporting arrival of the mobile station to which the message relates in said area of the center; and
said updates after a reset;

each update triggering one of said updates aftre a reset being transmitted by one of said switching centers to exploit a contact between the center and one of said mobile stations that is in said area of the center and to which the message relates, the contact occurring after a preceding one of said visit update request messages transmitted by the center, the mobile station being one to which the preceding message relates, the contact being a first contact between the mobile station and the center after a reset.

7. The mobile telephony method of claim 6, wherein the priority level for a given one of the messages is selected from a scale of priority levels arranged so that a probability of exploitation of the given message decreases as the priority level decreases.

8. The mobile telephony method of claim 7, wherein said switching centers introduce a difference that can be detected by the home location register between said visit update requests and said update after a reset requests, the home location register assigning the update after a reset requests a lower priority level than the visit update requests.

* * * * *